United States Patent
Moore et al.

(10) Patent No.: US 9,142,003 B2
(45) Date of Patent: Sep. 22, 2015

(54) ADAPTIVE FRAME RATE CONTROL

(71) Applicant: Apple Inc., Cupertino, CA (US)

(72) Inventors: Christopher Moore, San Francisco, CA (US); Seejo K. Pylappan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 13/648,754

(22) Filed: Oct. 10, 2012

(65) Prior Publication Data
US 2013/0328894 A1    Dec. 12, 2013

Related U.S. Application Data

(60) Provisional application No. 61/657,842, filed on Jun. 10, 2012.

(51) Int. Cl.
*G06T 1/20* (2006.01)
*H04N 21/414* (2011.01)
*H04N 21/4402* (2011.01)
*H04N 21/45* (2011.01)

(52) U.S. Cl.
CPC ............ *G06T 1/20* (2013.01); *H04N 21/41407* (2013.01); *H04N 21/440281* (2013.01); *H04N 21/4524* (2013.01)

(58) Field of Classification Search
CPC .................................. G06T 1/00; G06T 1/20
USPC .................................................. 345/501, 522
See application file for complete search history.

(56) References Cited

U.S. PATENT DOCUMENTS

| 6,520,910 | B1 * | 2/2003 | Kohls ............................ 600/300 |
| 7,769,540 | B2 * | 8/2010 | Pinkus et al. ................. 701/436 |
| 2002/0024999 | A1 * | 2/2002 | Yamaguchi et al. ..... 375/240.03 |
| 2002/0122471 | A1 * | 9/2002 | Ling .............................. 375/147 |
| 2009/0103448 | A1 * | 4/2009 | Waggener et al. ............ 370/253 |
| 2011/0084971 | A1 * | 4/2011 | Kuo et al. ..................... 345/501 |
| 2011/0150099 | A1 * | 6/2011 | Owen ...................... 375/240.26 |
| 2011/0313653 | A1 * | 12/2011 | Lindner ........................ 701/201 |

* cited by examiner

*Primary Examiner* — Devona Faulk
*Assistant Examiner* — Hai Tao Sun
(74) *Attorney, Agent, or Firm* — Kilpatrick Townsend & Stockton LLP

(57) ABSTRACT

Displaying frames on an electronic display. Each frame is characterized by a time. Determining a characteristic of data related to each element of a first set of frames, each frame characterized as within a first time period. Determining a rate of change over time of the characteristic. Determining a frame rate based on the determined rate of change. Displaying a second set of frames at the frame rate.

15 Claims, 5 Drawing Sheets

| RATE OF CHANGE (RAD/SEC) | FRAME RATE (FPS) |
|---|---|
| 0 | DEFAULT |
| .1 | 1.1*DEFAULT |
| .2 | 1.2*DEFAULT |
| .3 | 1.3*DEFAULT |
| .4 | 1.4*DEFAULT |
| .5 | 1.5*DEFAULT |
| .6 | 1.6*DEFAULT |
| .7 | 1.7*DEFAULT |
| .8 | 1.8*DEFAULT |
| .9 | 1.9*DEFAULT |
| 1.0 | 2.0*DEFAULT |
| ... | ... |

FIG. 4

ADAPTIVE FRAME RATE CONTROL

The present application claims priority from and is a non-provisional application of U.S. Provisional Application No. 61/657,842 entitled "ADAPTIVE FRAME RATE CONTROL" filed Jun. 10, 2012, the entire contents of which are herein incorporated by reference for all purposes.

FIELD

The disclosed technology relates to determining frame rate for an application using an electronic display.

SUMMARY OF THE TECHNOLOGY

The technology includes methods, computer program products, and systems for displaying frames on an electronic display. Embodiments of the technology are operative for determining a characteristic of data related to each element of a first set of frames, where each frame characterized as within a first time period; determining a rate of change over time of the characteristic; determining a frame rate based on the determined rate of change; and displaying a second set of frames at the frame rate.

In some embodiments of the technology, the determined characteristic is at least one of: an orientation of the frame, information entropy of the frame, and frame type. In some embodiments of the technology the first set of frames is associated with a planned route, and the second set of frames is the first set of frames. In some embodiments of the technology the first time period ends at a first end time, and displaying the second set of frames comprises displaying the second set of frames subsequent to the first end time. In some embodiments of the technology system is a personal navigation system. In some embodiments of the technology, the system is a smartphone and the computer program product is a navigation application.

DESCRIPTION OF THE DRAWINGS

Reference will now be made, by way of example, to the accompanying drawings which show example implementations of the technology.

FIG. 4 is a lookup table relating rate of change to frame rate in accordance with embodiments of the present technology.

DETAILED DESCRIPTION

Figure 1:
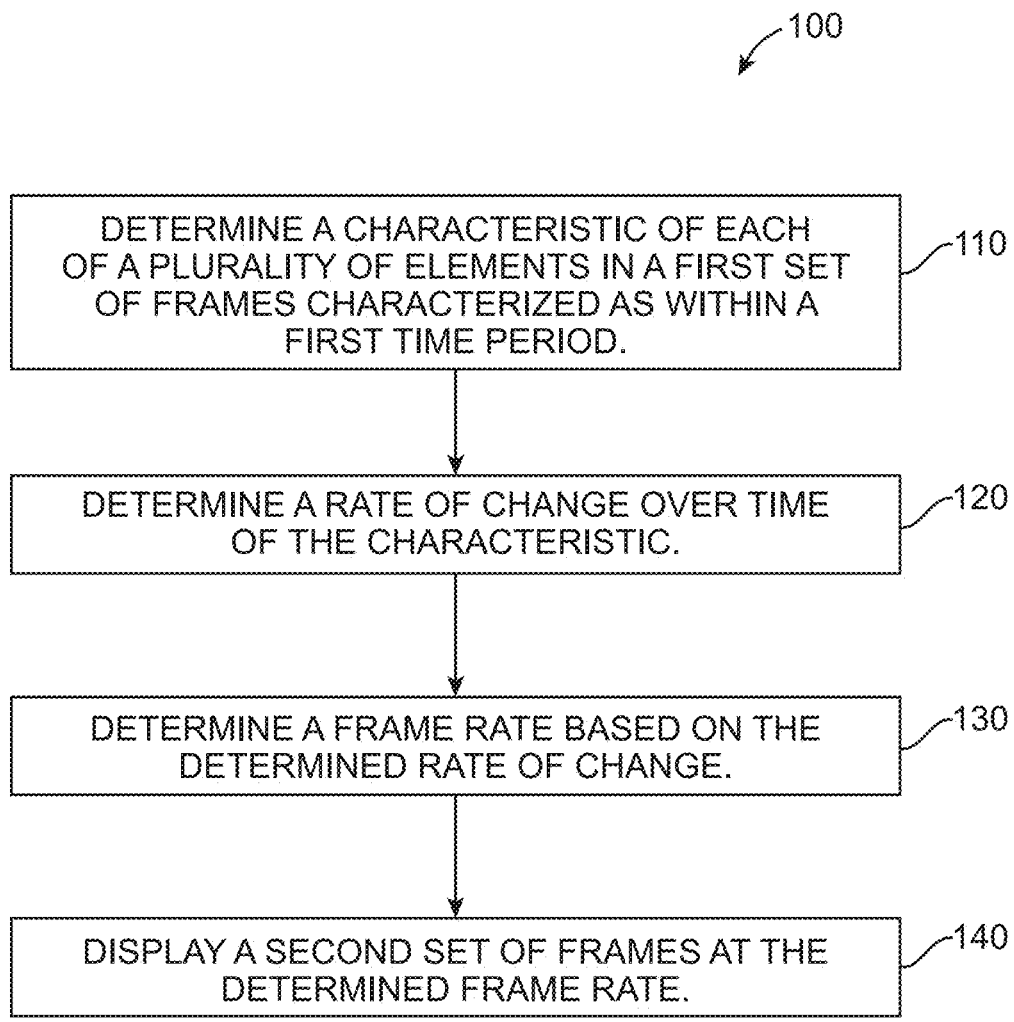
FIG. 1 is a flow chart illustrating methods in accordance with embodiments of the present technology.

Reference now will be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still other implementation. Thus, it is intended that the present technology cover such modifications and variations that come within the scope of the technology.

Electronic devices such as desktop personal computers, smartphones, mobile computers (e.g., laptops, netbooks, and tablets), portable media players, and global positioning system (GPS) navigation devices include, or are accompanied by, imaging devices—e.g., the display. The presentation of information on the display is typically managed by a display controller as sequence of frames. A digital video frame may be represented as a rectangular raster of pixels, either in an RGB color space or a color space such as YCbCr.

"Frame rate" is the frequency in frames per second (FPS) at which an imaging device displays sequential images. If the sequential images are presented at a high enough frame rate, an impression of motion/continuity can be created on the display. If the sequential images are presented at too low a frame rate, the impression may seem discontinuous. In general, the higher the frame rate, the more natural the impression of continuity. A typical frame rate for a display controller of a conventional electronic device is 60 FPS (hereinafter the "hardware refresh rate"). In the present application, enabling embodiments are disclosed for controlling the rate at which data is supplied to the display controller. While "frame rate" is used hereafter in this disclosure to refer to the rate at which data is supplied to the display controller, the present technology can be used to control the hardware refresh rate.

The processing required to present each frame at the display of a portable electronic device, such as a smartphone, can present challenges. Such processing takes time (contributing to latency), consumes power (decreasing battery life), produces heat (which can contribute to hardware failures and an unfavorable user experience), and may use processor resources that are unavailable for other tasks while processing frames.

In navigation systems such as GPS navigation systems commonly available integrated into vehicles, navigation applications in smartphones and tablets (e.g., the Maps application on the Apple® iPhone® mobile digital device, and the Apple® iPad® mobile digital device), and in stand-alone GPS devices, the perspective offered by the display can be modeled as virtual camera having a position near the device's geo-location, and an orientation that can be determined using one or both of GPS course and navigation context (e.g., where the device is in relation to the next maneuver). Orientation can also be determined by other methods, e.g., using a compass and an accelerometer of the device. In some situations, e.g., driving in a substantially straight line in a turn-by-turn navigation mode of the device, a satisfactory impression of continuity can be maintained at a lower frame than the conventional frame rate. In other situations, e.g., making a right turn at an intersection, driving around a hairpin curve, a frame rate higher than the conventional frame rate may be called for to present a satisfactory impression of continuity.

While enabling embodiments of the technology are disclosed herein in the context of a frames of a navigation application in a portable electronic device, the technology can be employed using other data types (e.g., route data) and can provide utility in other applications, e.g., games, other applications representing a point of view or orientation.

Embodiments of the present technology can adapt the frame rate of a display to a level that offers an acceptable impression of motion/continuity, while decreasing the contribution of frame processing to one or more of latency, power consumption, heat generation, and use of processor resources.

Referring to FIG. 1, methods 100 of the present technology are illustrated in a flow chart. Such methods 100 operate on data related to a first set of frames. The data related to the first set of frames includes some characteristic, the rate of change of which can be used to determine a frame rate. Preferably, the frames in the set form a sequence; each frame having associated therewith a time. While the technology is principally described herein using the orientation of a virtual camera in each frame, other data sets can be used as input to the process. Examples of other data sets include: route segment characteristics such a compass orientation of the route associated with frames, curvature of the route, the amount of linear motion, the characteristics of user input such as a gesture (particularly useful in non-navigation situations where the device may not be moving, but the user wishes to change the displayed perspective).

Given such a data related to a first set of frames, embodiments of the present technology can determined a characteristic of each of the plurality of frames in the set—step 110. In the present example, the characteristic is the orientation of virtual camera of a navigation application in each frame. Other characteristics are possible, including a signature of the frame as represented by the information entropy of the bits or pixel values representing the frame, the presence or size of a certain frame representation type (e.g., the presence of an i-frame in a video compression scheme, the size of a p-frame or b-frame in a video compression scheme).

In step 120, the technology determines the rate of change of the characteristic over time using the determined characteristic values and the time associated with each element in the data set. Determining the rate of change over time can be done with a pair-wise comparison of frames in the sequence. The rate of change can be determined as a statistic across the pairwise comparisons such as the mean in a window of the last N comparisons, or a median across the last number of comparisons over a given time. The longer the window, the more lag in the responsiveness of frame rate control, the shorter the window, the more susceptible the display is to jittery motion. A preferred window length is between 0.1 and 2.0 seconds. The rate of change can be a weighted mean, giving more weight to more recent changes. Those of skill in the relevant art are familiar with various ways of determining an aggregate parameter over series of data.

In step 130, the technology can determine a frame rate based on the determined rate of change. In some embodiments of the present technology this determination can be based on one or more of a lookup table, a formula, and user input. For example, a frame rate can be determined by correlating the determined rate of change to a value in a lookup table. A user may decide that frame rate is too slow, and provide the navigation device with input to increase the frame rate by some multiplier, for example by a factor of 1.1.

In step 140, the determined frame rate is then used to display a second set of frames. For example, where the technology keeps a running average across the last 10 frames to determine the rate of change, the next frame can be displayed at a time consistent with the running average as the determined frame rate. Here, the second set of frames is one or more frames subsequent the frames of the first set.

In another example, the technology can use planned route segments as the first frame-related data set, determine a rate of change in the compass direction of each route segment, determine a frame rate corresponding to that rate of change, and then if the navigation device enters such a route segment, the technology can use the determined frame rate to display frames associated with that route segment. In such a case, the second set of frames can be the same as the first set of frames.

Figure 2:
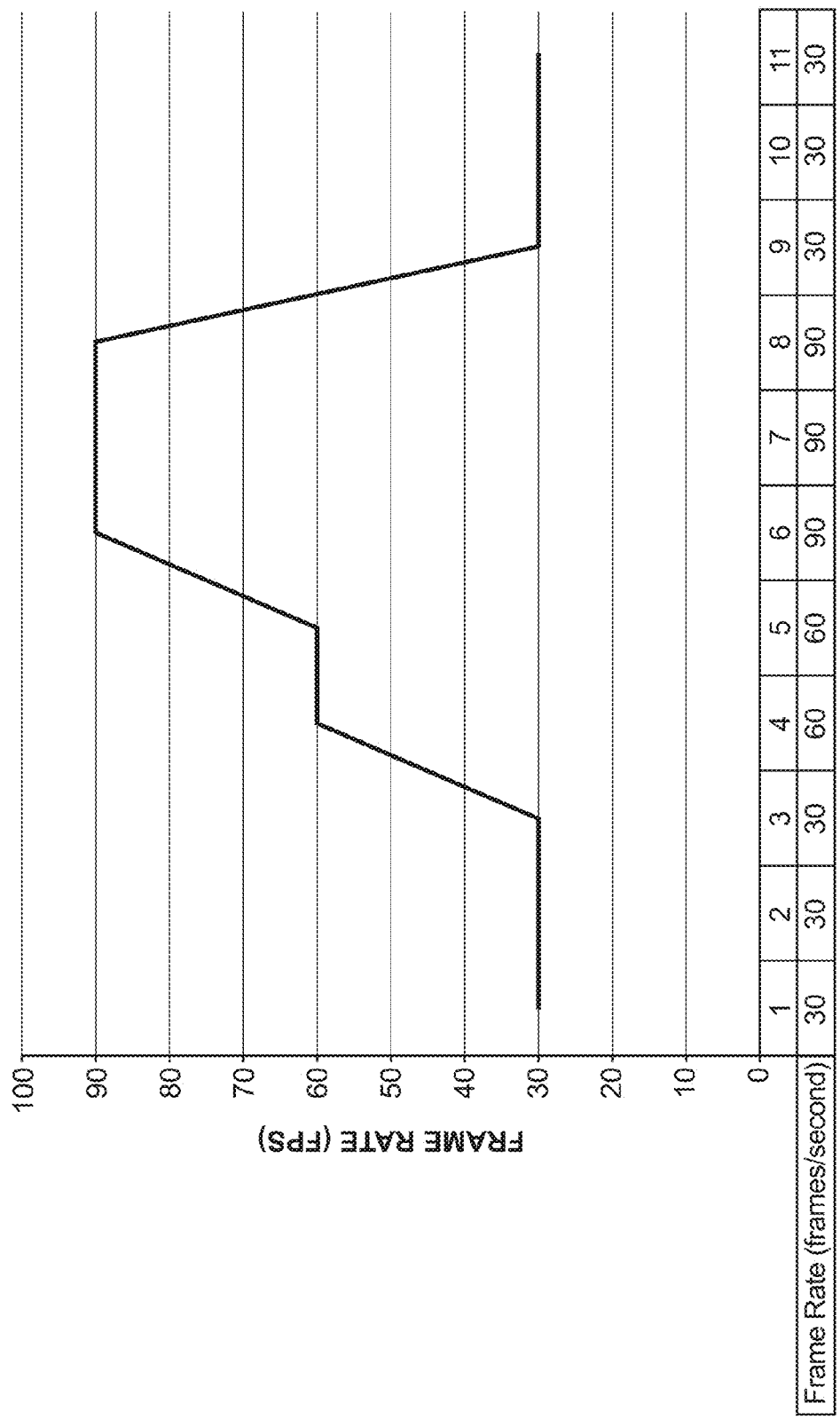
FIG. 2 is a frame rate profile along segments of a planned route in accordance with embodiments of the present technology.

Some embodiments of the technology can develop a frame rate profile for a planned route, e.g., as shown in FIG. 2, and then implement the profile as the route is traversed. In the profile of FIG. 2, segments 1-3 and 9-11 are substantially straight with little or no change in virtual camera orientation; segments 4-5 represent a mildly curving road; and segments 6-8 represent a hairpin turn or a sequence of right angle turns associated with a high rate of change of orientation of the virtual camera of the navigation device. Where planned route sections are analyzed in embodiments of the present technology, junctions and upcoming maneuvers in the planned route can be examined to determine a rate of change, while the frame rate for non-junction and non-maneuver sections can be set to a default. In some embodiments illustrated by FIG. 2, the hardware refresh rate is 90 FPS and lower frame rates as specified as a fraction, e.g., ⅔, ⅓, of the hardware refresh rate. In some embodiments, the technology controls the hardware refresh rate.

While the present technology is suited to implementation on a portable device such as a smart phone, portions of the technology such as profiling the frame rate of a planned route can be executed on platforms in communication with the portable device, e.g., a server in communication with a smartphone.

Figure 3:
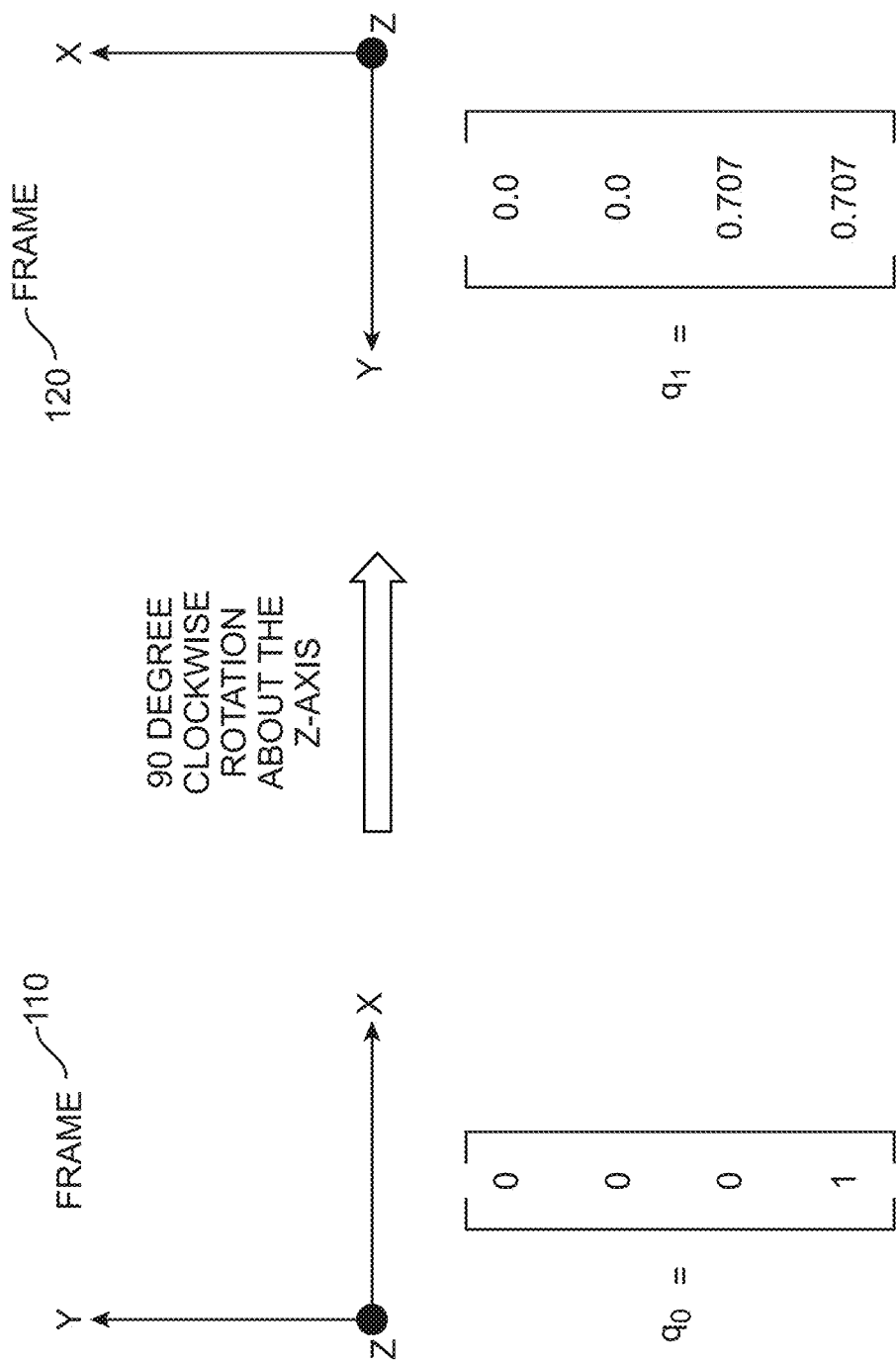
FIG. 3 is an illustration of rotations of a virtual camera of a navigation application represented by quaternions in accordance with embodiments of the present technology.
Figure 5:
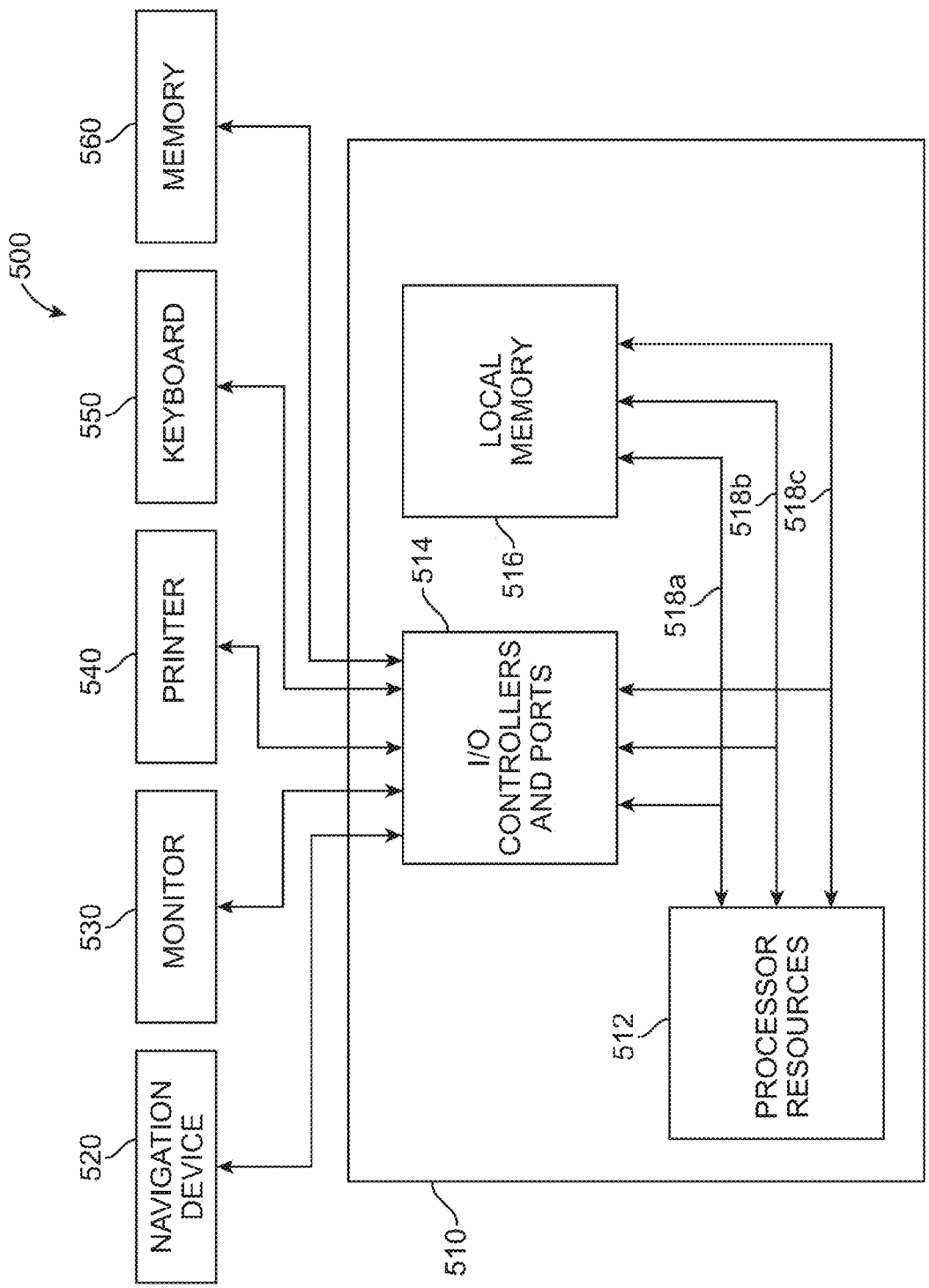
FIG. 5 is a block diagram of a data processing system in accordance with embodiments of the present technology.

Consider an example embodiment illustrated at least in part by FIG. 3. FIG. 3 illustrates virtual camera orientation quaternions for two consecutive frames, frame 110 and frame 120—a simple first set of frames. Frame 110 is represented by the quaternion q0=[q0.x, q0.y, q0.z, q0.w]=[0, 0, 0, 1] with the X-axis and Y-axis in the plane of the figure as shown, and the Z-axis in a positive direction out of the figure, thereby aligning the virtual camera's coordinate frame with the world coordinate frame for ease of illustration. The virtual camera orientation associated with Frame 120 is represented by the quaternion q1=[q1.x, q1.y, q1.z, q1.w]=[0, 0, 0.707, 0.707]. Frame 110 was rendered by the display at time t0=0.0 seconds and frame 120 was rendered by the display at time t1=0.1 seconds. Making frame 110 and frame 120 part of a first set of frames within a period 0.0 sec.≤t≤0.1 sec. The quaternion values correspond to a characteristic of each frame that is determined.

Between frame 110 and frame 120, the virtual camera has rotated 90 degrees about its Z-axis. Given only the quaternions associated with each frame, which is typically what is directly available in a navigation device or a navigation application running on a mobile device, the angle required to rotate from q0 to q1 can be computed as theta=2*a cos(dot(q0, q1)), where dot(q0, q1)=q0.x*q1.x+q0.y*q1.y+q0.z*q1.z+q0.w*q1.w. For this example, theta=a cos(0)=pi/2 radians. The rate at which orientation of the virtual camera is changing can be determined by calculating theta_dot=theta/(t1−t0). In this example theta_dot=(pi/2)/(0.1−0.0)=5*pi radians/second. For a larger first set of frames the mean_theta_dot between each frame q.# and a preceding frame can be computed for N different pairs of frames. N can be include frames from the last M seconds—e.g., from a window of the last 0.5 seconds.

Consider such a set of frames for which the mean_theta_dot=pi radians/second. The frame rate can be determined/set using fram_rate (mean theta_dot)={"A" FPS if mean_theta_dot≤5*pi radians/second; else "B" FPS}; where A=20 and B=30. Such a function can be implanted in code, or in a lookup table such as the example lookup table shown in FIG. 4.

The technology can find use in map applications generally, not only in navigation mode. For example when a user provides input, such as a gesture, to change the perspective of the display.

The present technology can take the forms of hardware, software or both hardware and software elements. In some implementations, the technology is implemented in software, which includes but is not limited to firmware, resident software, microcode, a Field Programmable Gate Array (FPGA), graphics processing unit (GPU), or Application-Specific Integrated Circuit (ASIC), etc. In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device.

The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

Input/output or I/O devices (including but not limited to keyboards 550, printers 540, displays 530, pointing devices 520, etc.) can be coupled to the system either directly or through intervening I/O controllers (e.g., 514). Network adapters can also be coupled to the system to enable the data processing system to become coupled to other data processing systems or re-mote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

What is claimed is:

1. A method for displaying frames on an electronic display, each frame characterized by a time, the method comprising:
    determining one or more characteristics of data related to each element of a first set of frames, each frame in the first set of frames characterized as being within a first time period, the one or more characteristics including an orientation of the frame, wherein the orientation of the frame is an orientation of a virtual camera of a navigation application;
    analyzing sections of a planned route of the navigation application to determine a frame rate profile for the planned route;
    determining, based at least in part on the frame rate profile, a rate of change over time of:
    the one or more characteristics and the orientation of the virtual camera;
    determining a frame rate based on the determined rate of change of the one or more characteristics and the determined rate of change of the orientation of the virtual camera; and
    displaying a second set of frames at the frame rate.

2. The method of claim 1, wherein:
    the one or more characteristics further include at least one of an information entropy of the frame, and a frame type, wherein the information entropy of the frame is the information entropy of bits or pixel values representing the frame.

3. The method of claim 1, wherein:
    the first set of frames is associated with the planned route, and
    the second set of frames is the same as the first set of frames.

4. The method of claim 1, wherein:
    the first time period ends at a first end time, and
    displaying the second set of frames comprises displaying the second set of frames subsequent to the first end time.

5. A non-transitory computer readable storage medium having computer program code stored thereon for displaying frames on an electronic display, each frame characterized by a time, the computer program code comprising instructions that, when executed by a data processing system, cause the data processing system to perform operations comprising:
    determining one or more characteristics of data related to each element of a first set of frames, each frame in the first set of frames characterized as being within a first time period, the one or more characteristics including an orientation of the frame, wherein the orientation of the frame is an orientation of a virtual camera of a navigation application;
    analyzing sections of a planned route of the navigation application to determine a frame rate profile for the planned route;
    determining, based at least in part on the frame rate profile, a rate of change over time of:
    the one or more characteristics and the orientation of the virtual camera;
    determining a flame rate based on the determined rate of change of the one or more characteristics and the determined rate of change of the orientation of the virtual camera; and
    displaying a second set of frames at the flame rate.

6. The non-transitory computer readable storage medium of claim 5, wherein:
    the one or more characteristics further include at least one of an information entropy of the frame, and a frame type, wherein the information entropy of the frame is the information entropy of bits or pixel values representing the frame.

7. The non-transitory computer readable storage medium of claim 5, wherein:
    the first set of frames is associated with the planned route, and
    the second set of frames is the same as the first set of frames.

8. The non-transitory computer readable storage medium of claim 5, wherein:
    the first time period ends at a first end time, and
    displaying the second set of frames comprises displaying the second set of frames subsequent to the first end time.

9. A system comprising:

a data processing system; and a computer program product for displaying frames on an electronic display, each frame characterized by a time, the computer program product comprising:

at least one computer-readable medium storing program code, that when executed by the data processing system, cause the data processing system to perform operations comprising:

determining one or more characteristics of data related to each element of a first set of frames, each frame in the first set of frames characterized as being within a first time period, the one or more characteristics including an orientation of the frame, wherein the orientation of the frame is an orientation of a virtual camera of a navigation application;

analyzing sections of a planned route of the navigation application to determine a frame rate profile for the planned route;

determining, based at least in part on the frame rate profile, a rate of change over time of:

the one or more characteristics and the orientation of the virtual camera;

determining a frame rate based on the determined rate of change of the one or more characteristics and the determined rate of change of the orientation of the virtual camera; and displaying a second set of frames at the frame rate.

10. The system of claim 9, wherein the one or more characteristics further include at least one of an information entropy of the frame, and a frame type, wherein the information entropy of the frame is the information entropy of bits or pixel values representing the frame.

11. The system of claim 9, wherein:

the first set of frames is associated with the planned route, and the second set of frames is the same as the first set of frames.

12. The system of claim 9, wherein:

the first time period ends at a first end time, and displaying the second set of frames comprises displaying the second set of frames subsequent to the first end time.

13. The system of claim 9, wherein the data processing system is a personal navigation system.

14. The system of claim 9, wherein the data processing system is a smartphone and the computer program product is a navigation application.

15. The system of claim 9, wherein the data processing system is a tablet computer and the computer program product is a navigation application.

* * * * *